Sept. 15, 1959 T. BOSTROEM 2,904,321
LIQUID BATH FURNACE AND METHODS FOR CONTINUOUS
HEAT TREATMENT OF ARTICLES OF MANUFACTURE
Filed March 13, 1953 6 Sheets-Sheet 1

Inventor
T. Bostroem

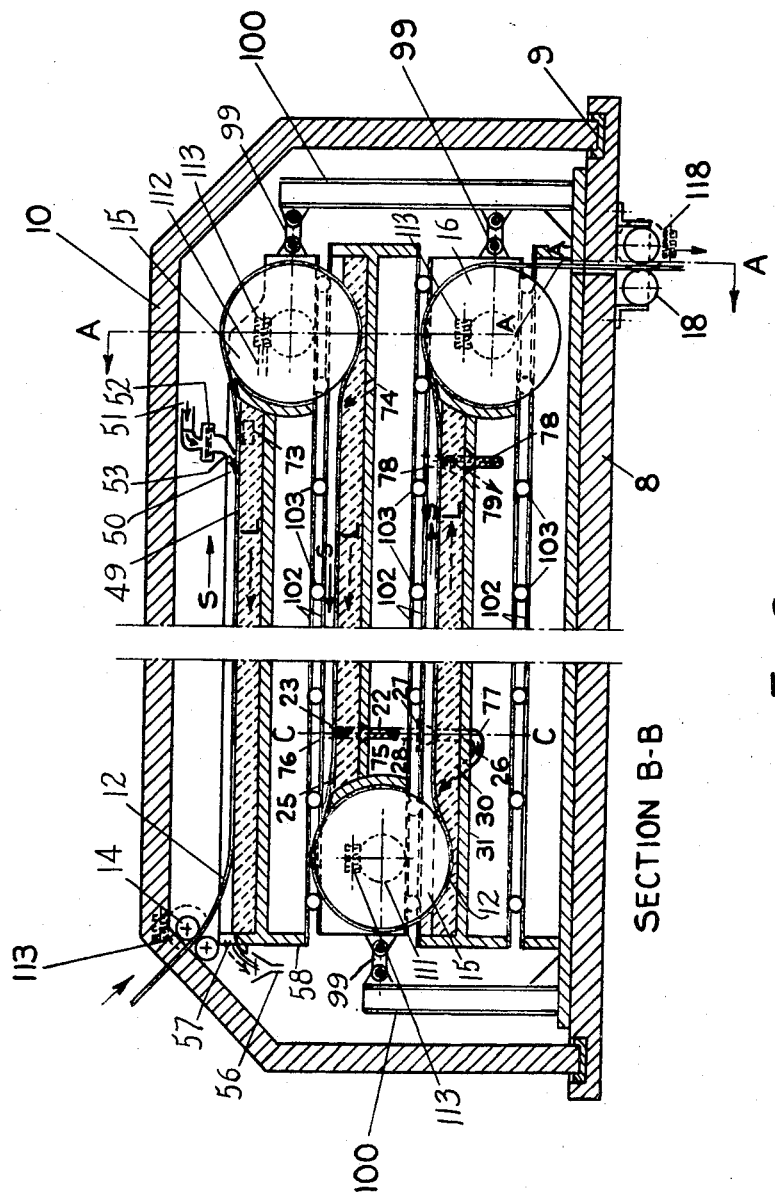

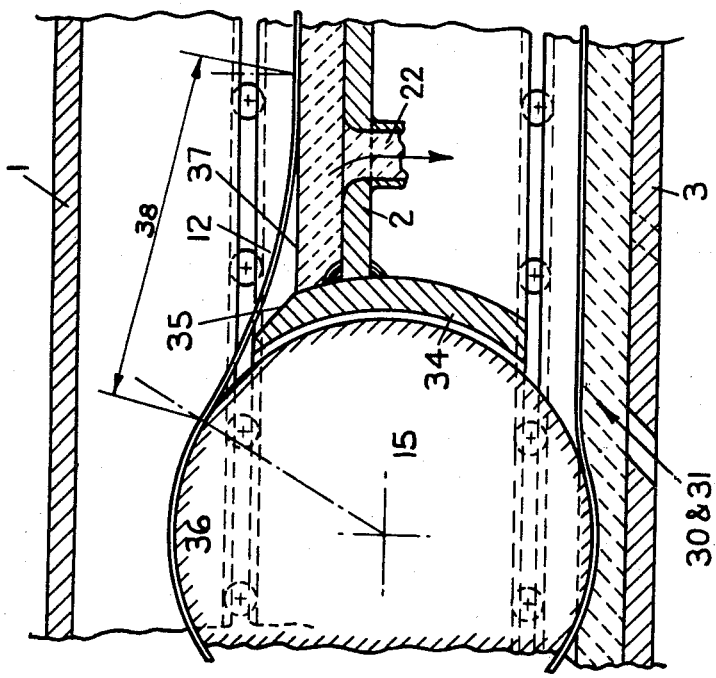
FIG. 6
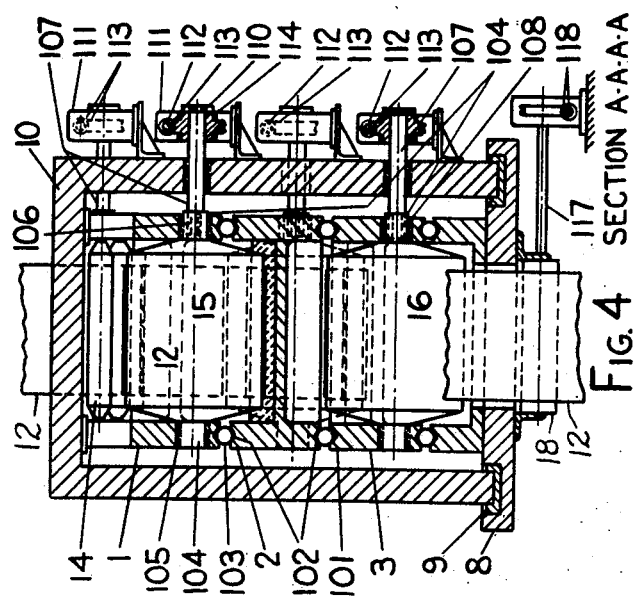
FIG. 4 SECTION A-A-A-A
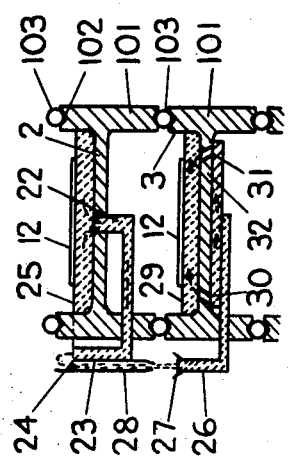
FIG. 5 SECTION C-C
Inventor
T. Bostroem
By Glascock Downing Seebold
Attys.

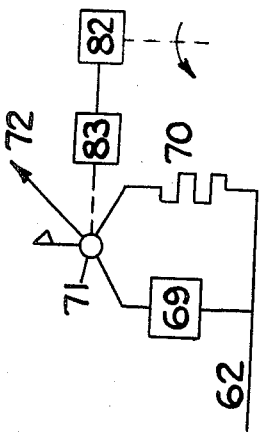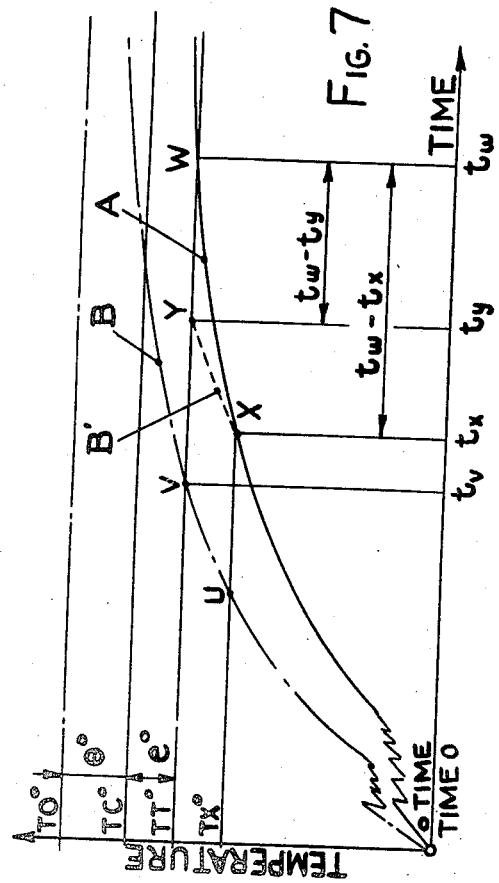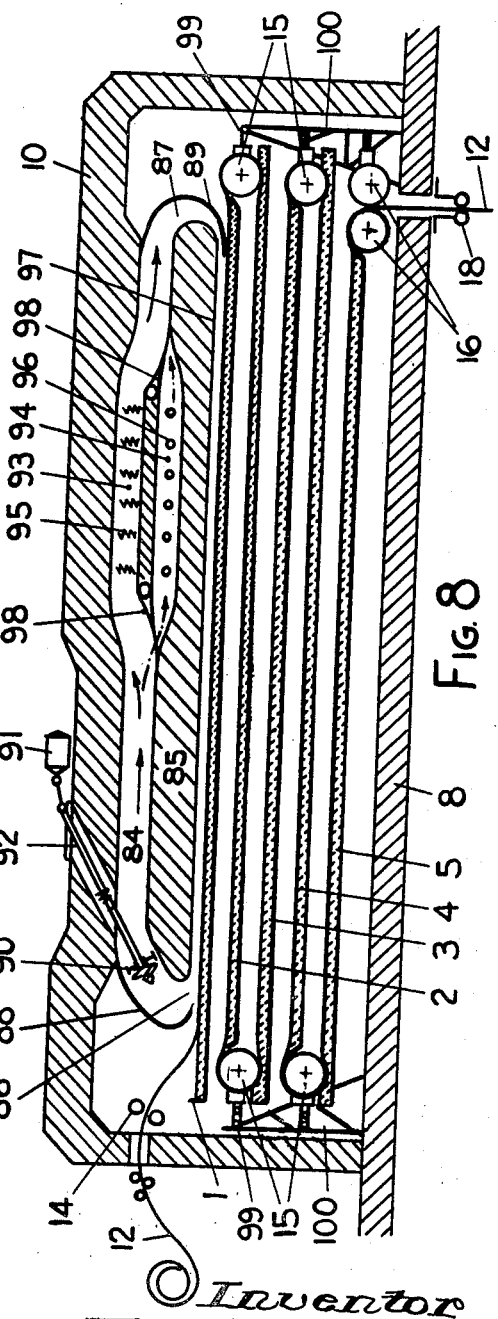

Sept. 15, 1959     T. BOSTROEM     2,904,321
LIQUID BATH FURNACE AND METHODS FOR CONTINUOUS
HEAT TREATMENT OF ARTICLES OF MANUFACTURE
Filed March 13, 1953
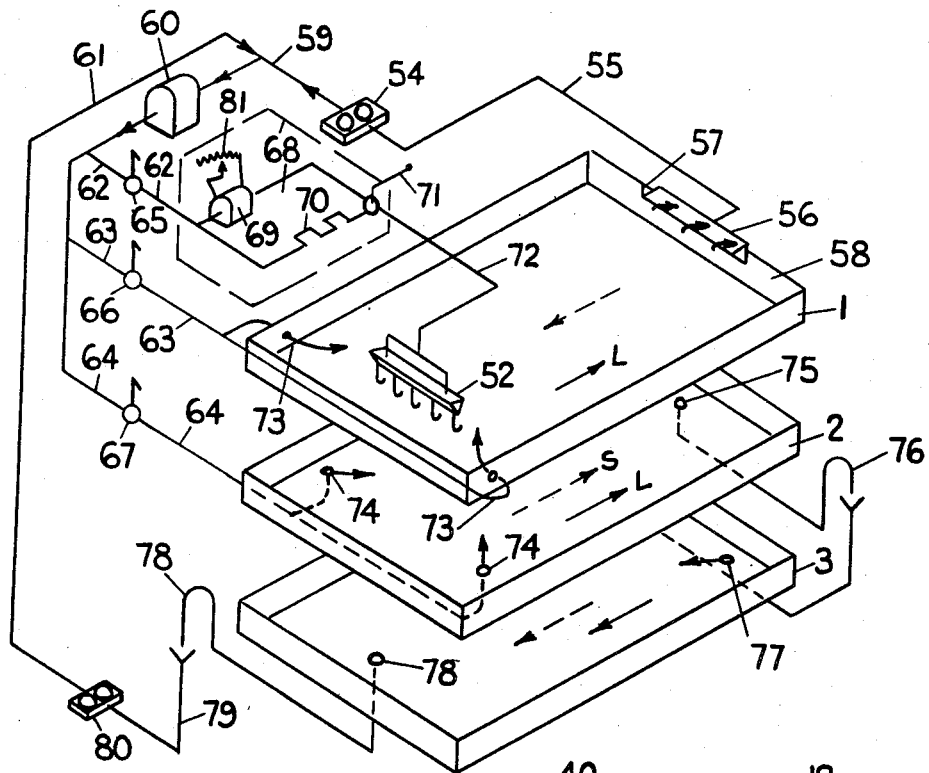
Fig. 9
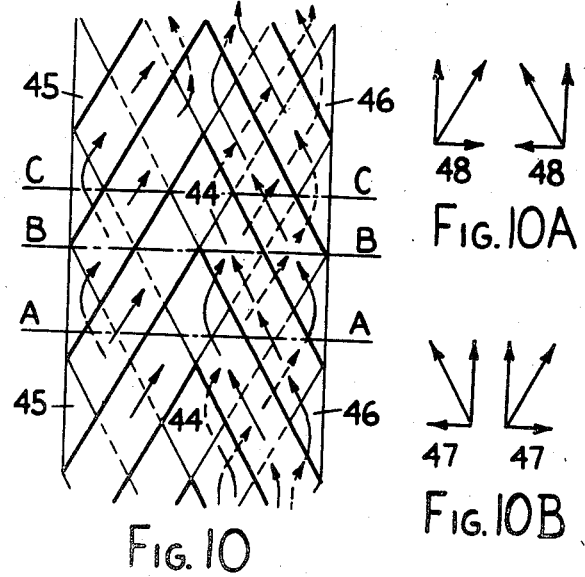
Fig. 10    Fig. 10A    Fig. 10B
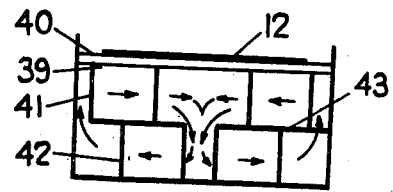
Fig. 11   SECTION A-A
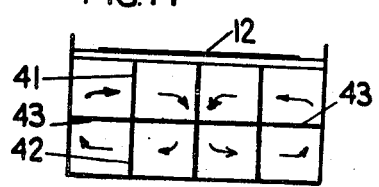
Fig. 12   SECTION B-B
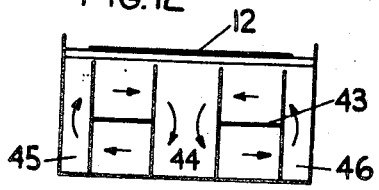
Fig. 13   SECTION C-C
Inventor
T. Bostroem

United States Patent Office 2,904,321
Patented Sept. 15, 1959

2,904,321

LIQUID BATH FURNACE AND METHODS FOR CONTINUOUS HEAT TREATMENT OF ARTICLES OF MANUFACTURE

Theodore Bostroem, Middlebury, Conn.

Application March 13, 1953, Serial No. 342,242

16 Claims. (Cl. 263—3)

This invention relates to improvements in liquid bath furnaces, for a continuous heat treatment of solid articles made of light alloys or the like, more particularly strip, bar, wire, tube or other sections of indefinite length as well as separate, comparatively short articles arranged to form a band of continuously advancing units. More particularly the invention relates to improvements in liquid bath furnaces of the kind specified above and in which the heat treatment is effected by causing the article or articles to be treated, to pass in a continuous manner over the surface of a bath or baths of liquid substance, maintained at a predetermined temperature and having a specific weight greater than that of the treated article or articles, so that the latter float on the bath of molten substance.

In view of the fact that the article to be treated is generally in a relatively cold condition prior to its heat treatment, it has been previously suggested, first to heat up rapidly the article to the temperature of the heat treatment and then maintain the article soaking at said temperature, for a predetermined time. To this end, the article to be treated was caused to pass first through a heating up bath and then was admitted to a soaking bath.

Furthermore, in said prior method, the article, before being extracted from the soaking bath, was subjected to a slight cooling, intended to increase its resistance, so as to permit its handling by means of adequate transportation devices. This limited cooling of the treated article or articles is not to be confused with the quenching operation performed on the articles after they leave the furnace, which may be the final step of the heat treatment under consideration.

In a furnace of an earlier construction, these three operations are performed in a single vat constituted by an elongated reservoir, comprising three zones or compartments, to wit:

(a) an entrance or heat up zone or compartment, in which the articles are energetically heated up to a soaking temperature, which is just below the critical temperature of the metal of said articles;

(b) a main or soaking zone or compartment, occupying the major part of the vat, in which the articles receive the heat treatment proper, which consists in maintaining said articles for a predetermined time at said soaking temperature, and (c) a final precooling zone or compartment, in which a predetermined drop of temperature is produced to cool the articles to a sufficient degree to permit an easy handling thereof by an appropriate apparatus.

The latter operation concerned more particularly the case of articles of indefinite length, such as strip, wire etc., where suitable unwinding and rewinding devices were required at the strip entrance and strip exit ends of the vat respectively. The unwinding devices at the strip entrance end of the vat were adapted to push the article into the bath and onto the surface of the molten metal, whereas the strip exit end rewinding devices were pulling the article out of the bath, the article being then sufficiently cooled to withstand such handling.

In the application of the above process to articles made of light alloys, such as light alloy continuous strip or the like, it has been found that the length of the required furnace becomes excessive, if one intends to obtain a high hourly production of such an article. In fact, light alloys of high qualities require a certain minimum time for their soaking. As a result, the soaking bath or compartment, in case of a continuous heat treatment process, must have a predetermined length for a given rate of production, and this length increases in proportion with the requirements of higher rates of production.

On the other hand, light alloys have a very light color, and are usually heat treated in cold rolled or drawn condition, which make their surface highly heat reflectant. As a result, their heating up is more difficult and requires a longer time if compared with other metals.

Still another limitation of the rate at which an article can be heated up in the method under consideration, results from the necessity of meeting the possibility of a forced stop in the propulsion of the treated article, such as continuous strip, through the furnace. In fact it is generally known that light alloys are critically sensitive to overheating. Now, in order to transmit heat from a liquid bath to a solid article under treatment floating thereon, it is necessary to have the bath hotter than the article, and the greater is the difference between the temperature of the bath and of the article, the greater will be the rate at which the article will be heated up. However, in the case of the heat up bath, the above considerations and the danger of a forced stop, do not allow giving to the temperature of the heat up bath a value above the critical temperature of the metal under treatment.

It results that a rapid heating up of the article occurs only when the same is cold and, as the temperature of the article approaches the heat treatment value, the intensity of the heating up rapidly decreases. The heating of the article to its heat treatment temperature requires therefore a heating up bath of a certain minimum length, which makes the overall length of the furnace too large if a high hourly production is required.

The general object of the present invention is to provide an improved liquid bath furnace of the type specified above, in which the overall length of the furnace may be kept within reasonable limits for a desired rate of production.

Another object of the invention is to provide an improved structure for a liquid bath furnace of the type specified, whereby the length of the soaking bath or zone can be given a reduced overall length for a given hourly production.

Another object of the invention is to provide, in application to a liquid bath furnace of the type specified, a new method of an accelerated heating up of a continuously propulsed article, floating on a bath of a hot substance, whereby the length of the heating up zone can be substantially reduced.

The object of the invention is also to provide an improved structure of a liquid bath furnace, comprising a series of superposed liquid baths, through which the article to be treated, such as a continuous strip or the like, is passed in succession in a continuous manner.

A still further object of the invention is to provide an improved structure of a liquid bath furnace, in which the liquid bath is composed of a stack of superposed baths, through which the article to be treated, such as continuous strip or the like, is passed in succession, in a continuous manner and in which the upper bath forms the heat up bath and the following baths—the soaking baths.

Another object of the invention is to provide a novel method of an accelerated heating up of the article under treatment, such as a continuous strip or the like, which consists in additionally heating up the article, at the end of its travel over the heat up bath, by introducing into direct contact with the exposed surface of the moving article, a flow of hot fluid having a temperature slightly above the critical temperature of the substance of the article to be treated.

A further object of the invention is to provide a novel method of an accelerated heating up of the article under treatment, such as continuous strip or the like, which consists in additionally heating up the article, at the end of its travel over the heat up bath, by subjecting its exposed surface to the action of a flow of an overheated fluid, controlled in accordance with the speed of travel of the article under treatment.

Another object of the invention is to provide, in association with the overheated fluid flow producing the additional heating up of the article at the end of its travel through the heat up bath, a control mechanism suppressing said flow and replacing it by a flow of somewhat cooler fluid, when the speed of travel of the article falls below a predetermined value or down to zero.

Various other objects, characteristic features and attributes of the invention will be in part apparent and in part pointed out as the particular organization and structure of installations herein disclosed as typical embodiments of the invention are described.

In describing in detail particular embodiments of the invention, reference will be made to the accompanying drawings, in which like reference letters and numbers are used to designate similar and corresponding components or elements on all figures and in which:

Fig. 3 is a vertical longitudinal section view of the liquid bath furnace according to the invention, showing various detail features of its construction.

Fig. 4–a is an enlarged view of constructional details of the furnace shown in Fig. 4.

Fig. 5 is a schematic view of an overflow communication connection between successive vats of the furnace of Figs. 3 and 4.

Fig. 6 is an enlarged view of a structural detail of same furnace showing the operation of a driving pulley.

Fig. 7 is an explanatory diagram of the accelerated heating up process, according to the invention.

Fig. 8 is a schematic representation, in a vertical, longitudinal section, of another embodiment of the liquid bath furnace, in which a heated gas is used to provide an accelerated heating up operation in accordance with the invention.

Fig. 9 is a diagram of circulation circuits of the liquid substance used in the various vats of the furnace.

Fig. 10 to Fig. 13 are diagrams of the arrangements used to provide a controlled circulation of the bath substances in various vats of the furnace.

Fig. 14 is a schematic view of a detail arrangement of the installation.

Figure 2:
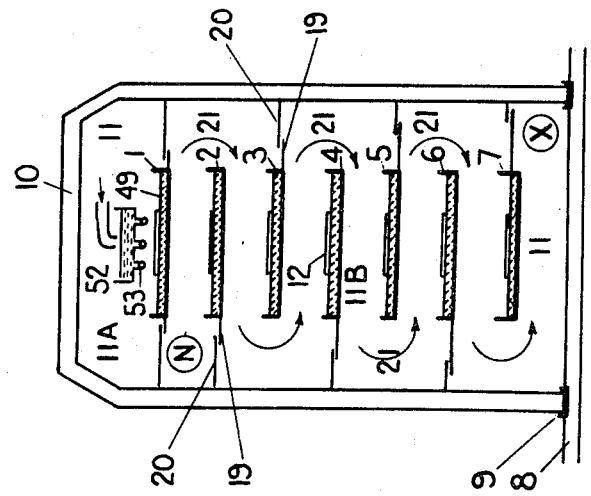
Fig. 2 is a schematical representation of a vertical cross section of the same furnace.
Figure 1:
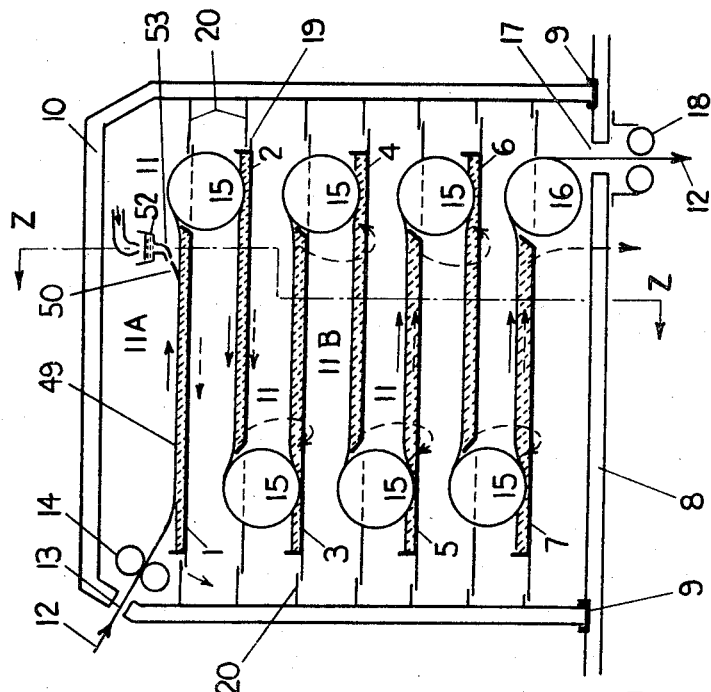
Fig. 1 is a schematic representation of a vertical, longitudinal section of a liquid bath furnace according to the invention.

Referring first to Figs. 1 and 2, the liquid bath furnace, according to the invention, as shown therein, comprises a stack of superposed vats 1 to 7, resting on a thermally insulated base 8, forming the bottom of the furnace. The base 8 is provided with an appropriate seal structure 9, extending all around the furnace and receiving, in a gas tight relation, the lower edge of an insulating hood or cover 10, adapted to be lowered down onto said seal structure 9, so as to encompass said stack of vats, 1 to 7 and form around said vats a gas tight chamber 11, forming the inside of the furnace.

The article to be treated, for instance in the form of an endless metallic strip 12 which may be an aluminum or magnesium light alloy strip, or the like, is fed continuously into the furnace, and onto the bath surface of the upper vat 1, through an opening 13 in the cover or hood 10. This feeding is effected under the control of a suitable entry pulley arrangement 14. Strip 12 is then guided successively through the superposed vats 1 to 7, by means of direction reversing and driving pulleys 15, provided at the opposite ends of successive vats 1 to 7.

Finally strip 12 passes over an end pulley 16 and then is led out of the furnace through an opening 17, of the base 8 of the furnace, by means of exit pulleys 18. The speed of propulsion of the strip is determined by the desired rate of production in weight per unit of time, divided by the weight of the strip per unit of length. On the other hand, the time required for each element of the metal to become homogenous, i.e. for the ingredients to be dissolved in the basic metal, varies with different alloys, cross sections etc. of the material to be treated and determines, in combination with the speed of propulsion, the length of the heat up bath and the total length of the soaking zone. By the present invention, this soaking zone is subdivided into several superposed sections, which fact contributes to a substantial reduction of the overall length of the furnace.

Preferably the upper vat 1 constitutes a heating up vat intended to rapidly heat up the product or article to be treated, to its final treating temperature. The following vats comprising six successive and superposed vats 2 to 7, as shown in Figs. 1 and 2, constitute the soaking vats, in which the article to be treated, while passing through said vats, is soaked at a constant temperature corresponding to a desired heat treatment.

Reference numbers 19 and 20 indicate baffles respectively attached to the vats 1 to 7 and to the inner sides of the furnace cover 10. These baffles are so arranged, that when the furnace cover 10 is lowered down, baffles 20, carried by the furnace cover 10 are applied against baffles 19, secured to the vats, in order to provide between the successive vats 2 to 7 of the soaking zone and transversely to the furnace, a zig-zag shaped channel for the circulation of a controlled atmosphere as indicated by arrows 21. On the other hand, baffles 19 and 20 of the upper vat serve to divide the inside of the furnace in two zones: the heating up zone or compartment 11–A above the upper vat 1 and the soaking zone 11–B comprising the other vats 2 to 7. The baffles 19 of successive vats and the corresponding baffles 20 of the furnace cover 10, vary progressively from the top to the bottom of the furnace, in opposite direction or relation, the former having their shortest baffle at the top and the longest at the bottom, whereas the latter, having the longest baffle at the top and the shortest at the bottom. This variation in length of the baffles is such, that the successive baffles 20 on the furnace cover 10 can pass clear of any baffles 19 on the vats, when said furnace cover 10 is lifted up. The controlled atmosphere may be produced and maintained within both zones of the furnace by suitable means, forming no part of the present invention.

The controlled atmosphere for the soaking zone may be introduced into the furnace by an opening "N" in the upper part of the furnace cover 10, and caused to circulate around the successive vats, as indicated by arrows 21, toward the bottom 8 of the furnace, for finally being withdrawn from the furnace by an opening "X," provided underneath the last vat 7. Heating means known per se and not shown in the drawings, may be provided in the furnace to help in maintaining inside the furnace, a temperature as close as possible in modern practice, to the critical temperature of material of the article to be heat treated.

In the soaking zone 11-B, said means are provided mainly to compensate for the heat losses to the outside atmosphere, while in the heat up zone 11-A, said means may be arranged to help in the heating up of the article to be treated, which enters said zone in a relatively cold condition. Considering the limits of accuracy of presently available temperature regulating apparati, the heat transfer fluids of the furnace and of the baths may be kept 5° to 10° F. below the critical temperature of the alloy undergoing the heat treatment.

At this moment it may be proper to explain, that by the critical temperature of a light alloy is meant, in accordance with current practice, the temperature at which the ingredient rich eutectic core of the material structure, that is the last to solidify in the process of formation of the ingot, melts, causing a quasi permanent spoiling of the metal structure, and after which the piece of metal under consideration is usually only good for remelting. Actually, the subject heat treatment, universally applied in a noncontinuous form, aims to disperse the euctectical portion of the alloy among the parts poorer in ingredients at temperatures immediately below the critical temperature and then fix the uniform distribution of the ingredients by quenching or rapid cooling of the alloy, thereby improving the mechanical and anti-corrosive properties of the latter. The critical temperature varies from alloy to alloy but usually is comprised between 800° and 950° F.

The bath substance in the vats, which in accordance with applicant's earlier U.S. Patent No. 2,525,203 preferably is constituted by a molten metal, chemically and physically neutral with respect to the metal of the article under treatment, is maintained in circulation through the successive vats 1 to 7 under the action of power means described later. In the soaking vats, the bath substance circulates in the general direction of the movement of the strip at a speed slightly exceeding, for instance up to 10% approximately, the desired speed of the strip, thus helping in propulsing the same and in maintaining it at an optimum temperature throughout the soaking zone. In fact, in the soaking zone, the strip is soft to the extent, that its propulsion by mechanical means alone may be difficult.

In the heat up vat 1, the bath circulates in a general direction opposite to the movement of the strip or article to be treated 12, in order to speed up the heat exchange between the bath and the article, thus making a better use of the heat of the liquid bath substance. It is understood, of course, that in the heat up vat 1, where article 12 enters at a temperature considerably below the critical temperature, a rapid heat exchange between the bath and the article influences directly the length required for the heat up vat. However, the rate of flow of the bath substance in this vat must not be less than that, which would cause any chilling of the bath substance by the relatively cold strip entering the bath.

In the heat up vat 1 the strip 12, entering said vat, is sufficiently stiff over a major portion of its length, to be pushed floating over the bath circulating in the opposite direction, under the control of the strip feed device 14.

The circulation of the bath substance in the heat up vat 1, on one hand, and the soaking vats 2 to 7, on the other hand, is produced by separate circuit means, as it will appear hereinafter. In the heat up vat 1, as well as in the soaking vats 2 to 7, the bath substance, introduced at one extremity of the vat, leaves said vat by overflow at its opposite extremity. At the end of heat up vat 1, the bath substance leaving said vat is collected to be thermally reconditioned and recirculated immediately thereafter.

In the soaking zone 11-B, the bath substance introduced at the strip entrance side of the upper soaking vat 2, is evacuated at the opposite side thereof, into the strip entry side of the immediately following vat 3. This arrangement is repeated throughout successive vats of the soaking zone. The bath substance from the last vat 7, is led out to the pumping and temperature regulating arrangement to be described later.

The passage of the bath liquid from one soaking vat to the other, next below, is produced by an overflow connection, best shown in Fig. 5. This connection comprises an outlet conduit 22, opening in the bottom of a given vat, at the center of the strip exit end thereof, which conduit has an upward inflexion 23, providing an edge 24 for the overflow of the substance, at a level substantially corresponding to the level 25 of the upper of the two vats under consideration. This connection further comprises, in communication with the lower vat, an inlet conduit 26, having a funnel 27, arranged to collect the substance from the overflow conduit 28 of the upper vat. This conduit 26 opens in the bottom of said lower vat 3 at the strip entry end thereof.

Preferably inlet 26 is adapted to receive the overflow from the upper vat at a level 29 of the lower vat and leads to two orifices or nozzles 30 and 31, in the bottom 32 of said lower vat. These nozzles are located at the opposite sides of the vat and are adapted to direct the stream of incoming substance underneath and toward the center portion of the strip 12, at the points where the latter leaves the driving roller 15, as better shown in Fig. 6.

In this way, the evacuation of the liquid substance from the upper vat 2 does not affect the picking up of the strip 12 by the pulley 15 of said vat. On the other hand, the entry of the liquid substance into the following vat 3, has a tendency to centralize strip 12 in said vat 3 and contributes in pressing strip 12 against pulley 15, the latter being mounted, with respect to the lower bath level, so as to dip partially into said bath, as shown in Fig. 6.

As shown in Figs. 3 and 6, the successive vats have their strip exit end walls 34, sloped, as at 35, in such a manner and at such a level, that the top of the driving pulley 15 is only slightly above the level 37 of the bath, thus reducing to a minimum the catenary 38 of the strip 12 lifted by pulley 15 from the bath surface 37.

Furthermore, in accordance with the invention, the vats used in the described furnace are provided, as shown in Figs. 10 to 13, with a network of baffles or partitions, tending to impart a directed or controlled circulation to the bath liquid, so as to exert on the floating strip 12 a centralizing action. These baffles or partitions extend from the bottom of the vat to a level 39, just below the surface 40 of the bath, but with a sufficient clearance so as to avoid any possibility of the strip 12 coming into contact therewith. There are two networks of baffles and partitions, one above the other, respectively designated by 41 and 42, separated by a horizontal partition 43, provided with openings 44, 45 and 46, permitting communication between its opposite sides. There is one central row of openings 44 along the central axis of the vat and two side rows of openings 45 and 46 along the opposite sides of the vat.

The baffles or partitions of the upper network 41 converge toward the central axis of the vat, in the direction of movement of the strip 12, while the baffles of the lower network 42 diverge along the same direction. The arrangement of the said two networks 41 and 42 of baffles, with respect to said orifices in the horizontal partition 43 is such, that the summit of a convergent channel formed by two pairs of partitions of the upper network 41, coincides vertically with the summit of a divergent channel formed by two pairs of baffles of the lower network 42, and that the central opening 44 in the horizontal partition 43 corresponds to said coincident summits of said convergent and divergent channels. The liquid substance tends to flow downwardly through said central openings 44 from the upper to the lower network of partitions.

On the other hand, the side openings 45 and 46 in the horizontal partition 43, corresponding to the superposition of the base portion of said convergent and divergent channels of the two networks 41 and 42, provide communication from said bottom divergent channels to said top convergent channels.

As illustrated in Figs. 10–A and 10–B, the described arrangement imparts to the liquid bath the tendency to circulate at the bottom of the vat with a transverse component 47 directed from the center of the vat to its sides and at the surface of the bath with a transverse component 48 directed from the sides toward the center of the vat, exerting thereby a centralizing action on the floating strip.

The various features of construction of the furnace described above permit improving to a great extent the operation of the liquid bath furnace of the type specified and provides the important advantage of reducing substantially the overall length of the furnace.

However, the reduction in length of the furnace that can be accomplished with the use of superposed vat structure is limited practically by the length of the heat up vat, in which the strip or similar articles to be treated must be heated up to its final treating temperature, at which it is sufficiently softened to permit successive bending thereof over a multiplicity of driving pulleys, which is the condition required for the construction of a soaking zone in the form of a stack of superposed soaking vats of reduced length.

Therefore, the present invention provides also a new method, whereby an accelerated heating up of a continuously fed article floating on a liquid bath can be accomplished, resulting in a reduction of length of the heat up vat 1, and, hence, of the whole furnace installation.

According to the invention, this method consists in additionally heating up the article under treatment at the end of the heat up zone 11–A, by introducing at said point and directly into contact with the exposed surface 49 of article 12, a flow 50 of an overheated fluid or a fluid at a temperature slightly above the critical temperature of the substance of said article.

Fig. 7 is a diagram showing graphically the influence of the application of this method to the heating up of the strip in the heat up vat 1.

It shows the reason why, even with a fluid only slightly overheated, it is possible to reduce to a considerable degree the time required for heating up a strip to the desired heat treating temperature, as compared to the time that would be required for bringing the strip to said temperature without the aid of said additionally admitted overheated fluid.

The coordinates of the diagram, Fig. 7 are: time—for the absciss and—temperature for the ordinate. In this diagram:

TC is the critical temperature of the alloy of a given strip to be treated,

TT is the temperature to which it is desired to heat up the strip; this temperature is lower by "$e°$" than the "critical" TC temperature mentioned above;

TO is the temperature of the overheated fluid; it is by "$\theta°$" higher than temperature TC;

TX is the temperature of the strip, when the action of the overheated fluid begins.

If the strip is heated up by a fluid at a temperature TC or just below it, the heating up of the material will proceed according to curve "A," and it will take "$tw$" seconds for the strip elements to heat up to temperature TT—point "W."

If the strip were heated by a fluid at a temperature "TO," which is "$\theta°$" above TC, the time required for heating up the strip to temperature TT would be "$tv$" seconds—point "V." This time is much shorter than time "$tw$," which means, that the strip could travel in a given heat up zone at higher speed, or, in other words, the heat up zone required for a given production and strip speed, could be shorter, as on curve "B."

However, considerations of the eventuality of a forced stop of the strip do not allow using a bath at a temperature above the critical because, in the case of such a stop, the strip would become rapidly overheated.

By subjecting the exposed surface of the floating strip to the action of a flow of an overheated fluid, which may be interrupted at any instant, it is possible to produce an accelerated heating up of the strip at the end portion of its travel through the heat up vat, substantially at a heating rate corresponding to curve "B."

In this way the heating up of the strip will be effected in two stages, O—X and X—Y, characterised by two different rates of rise of temperature of the strip. The first of said stages will correspond to the heating up of the strip by the bath on which it floats, in accordance with curve "A," to point "X," and the second, to the rapid heating up of the strip to its final temperature by the flow of the overheated fluid, brought into contact with its exposed surface, this last stage being performed following curve "B'," from point "X" to point "Y." The diagram shows, that even with a fluid only slightly overheated, the gain in heat-up time, represented by distance "$tw-ty$" is considerable.

The closer the treating temperature TT approaches the critical temperature TC, the greater is the advantage obtained with this method; in fact, assuming normal operation of solution heat treatment, when TT approaches TC temperature, the length of the heat up zone of the furnace increases substantially, whereas, with an operation according to the method of this invention, the heat up zone remains substantially unaffected. The temperature of the basting fluid, when basting is used, may be kept about 5° to 10° F. above the critical temperature of the alloy under treatment. Considering again the case of a light alloy strip the temperature critical of which is 900° F., the temperature of the basting fluid in such a case could be 905° to 910° F.

The accelerated heat up referred to above may be accomplished in different ways, using either liquid or gaseous fluid.

In one embodiment of the invention an accelerated heating up of a continuously fed article in the heating up vat of the furnace described above is accomplished with the use of the liquid substance of the heat up bath overheated to a temperature slightly above the critical temperature of the substance of the article under treatment. According to the invention, this accelerated heating up of the article is produced by "basting" the article floating on the bath surface with the overheated liquid substance of said bath.

This basting is produced substantially at the strip exit end of the heat up bath. At this point the strip has reached on the temperature—time curve "A" of Fig. 7 the point "X," at temperature TX, from which the temperature gradient, with respect to time, given by said curve, becomes very small, i.e., the temperature of the article rises only very slowly.

The application of "basting" at said point "X" causes the temperature of the strip to rise at a higher rate, corresponding to the temperature gradient of curve "B."

The acual increase of temperature of the strip takes place thus, first between points "O" and "X," at a rate corresponding to curve "A," based on the heat exchange between the bath and the floating strip and then, between points "X" and "Y," following curve "B'," at a rate corresponding to curve "B," based on the heat exchange between the "basting" liquid and the exposed surface of the floating strip.

As shown in Figures 1, 2, 3 and 9, the basting liquid 51 is supplied to a distributor trough 52, extending transversely to the movement of the strip 12 and provided with a plurality of nozzles 53, through which a metered quantity 50 of the overheated substance of the bath is poured onto strip 12. Preferably the flow of overheated substance 51 is directed in opposition to the movement of the strip 12. The overheated liquid, thus poured onto the floating strip 12, flows over its surface and then mixes with the bath.

The overheated liquid, while flowing over the strip, transfers its heat to the strip and thus cools down before mixing with the bath. The metered quantity of the basting substance and the degree of its overheat is correlated with the thickness of the strip under treatment and the speed of its propulsion, so as to: on one hand, bring up the strip to a desired treating temperature TT by the time it is picked up by the exit pulley 15 of the heat up vat 1, and, on the other hand, have the basting substance, cool down sufficiently, substantially to the bath temperature, by the time it flows off the strip and mixes with the bath.

The overheated liquid substance 51 is supplied to the distributor trough 52 by a suitable feeding system. Such feeding system may be constructed as shown in Fig. 9. In said Figure 9 this system is associated and combined with the complete bath substance circulation and temperature control system of the whole furnace, which latter is shown, by way of example, as comprising one heat up vat 1 and two soaking vats 2 and 3.

The feeding system for the basting liquid comprises a closed circuit including heating means to restore the temperature of the bath liquid, likewise pumping means for maintaining the circulation of the bath liquid through said circuit. The pumping means for said circuit are shown in 54 and may be constituted by any known circulating pump suitable for the purpose.

The pump inlet is connected to a conduit 55, leading to a collector 56, provided along a cut out portion 57 in the end wall 58 of heat up vat 1, at the strip entry end thereof. This cut out portion 57 forms an overflow outlet opening of said vat, through which the bath liquid flows over into collector 56.

The outlet conduit 59 of pump 54 is connected to the inlet of a heater 60, in parallel to conduit 61, forming part of another bath liquid circuit, provided for the circulation of the bath liquid through the soaking vats 2 and 3, to be described later. Heater 60 is adapted to bring the bath liquid to the temperature of desired heat treatment, i.e., a temperature slightly lower than the critical temperature of the material of the article under treatment.

The output of heater 60 feeds three separate conduits: 62, 63 and 64, regulated by valves: 65, 66 and 67. These conduits constitute the input sides of three circuits supplying the bath substance respectively to: the basting apparatus 68, the heat up vat 1 and the upper soaking vat 2.

In 69 is indicated an overheater for the basting liquid substance. This overheater is by-passed by a shunt 70, permitting the passage of a nonoverheated liquid substance to the basting apparatus, under the control of a distributor valve 71. The purpose of this arrangement is to suppress the supply of the overheated liquid substance to the basting apparatus 68 and eventually to replace it by a supply of a nonoverheated substance to said apparatus, upon a stop of the strip, thus diminishing the risk of overheating the strip under such conditions.

The liquid substance from valve 71 is supplied by a conduit 72 to a trough or pouring pan 52, from which the liquid substance is poured onto the moving strip 12 in the heat up vat 1.

The liquid substance from valve 66 is supplied by conduit 63 to inlet openings 73 in the side walls of the heat up vat 1, at the strip exit end thereof. The bath of the heat up vat 1 is then circulated in a general direction indicated by arrow L, in opposition to the movement of the strip indicated by arrow S.

The liquid substance from valve 67 flows through conduit 64 to inlet openings 74 of the first soaking vat 2, provided underneath the region where strip 12 leaves the corresponding pulley 15, as previously described with reference to Fig. 6.

The liquid bath circulates in the soaking vat 2 as indicated generally by arrow L, in the direction of the movement of the strip, indicated by the arrow S. At the strip exit end of vat 2 the liquid substance passes through an overflow connection 75—76—77 to the strip entry end of the following vat 3, from which it passes, by a similar overflow connection 78, into an outlet conduit 79. This conduit leads to the input of a pump 80, which forces the liquid substance to the input of the heater 60, through conduit 61 as previously mentioned.

It will be appreciated from the above description, that while the used liquid substance from the respective vats 1, 2 and 3 is pumped into the heater 60 from the heat up vat 1 and the soaking vats 2 and 3 by separate pumps 54 and 80, these vats are supplied from the common output of said heater 60. The latter also supplies the basting apparatus 68.

For the proper operation of the described method of an accelerated heat up of strip 12, it is necessary to provide means, whereby the intensity of said accelerated heat up may be regulated to adjust it for the material of the article to be treated, its thickness and the speed of propulsion thereof. Such regulation may be effected by adjusting the action of the overheater 69 during the regular run of the furnace. The overheater is generally constituted by a container, through which the liquid bath substance is caused to pass and in which this substance is heated up to a desired temperature. For the purpose of such a regulation, an adjustable automatic pyrometer—regulator, known per se, may be associated with overheater 69, to maintain the temperature of the basting substance at a desired value. An adjustable potentiometer—regulator 81 on Fig. 9 is shown for purpose of illustration, as permitting such regulation. This device may comprise a temperature sensing element, such as a thermo-couple, inserted in the overheater, to detect the temperature of the liquid bath substance, passing therethrough. This sensing element transmits a voltage proportional to the temperature to a measuring and controlling apparatus, which latter, through a suitable mechanism, controls the operation of a power unit, actuating, for instance, a control element of an electrical or other heating apparatus, associated with the overheater, so as to maintain the desired temperature inside of the overheater. Such devices, or systems, are known per se, as referred to in the "Metals Handbook," 1948 edition, on page 185 and in the references cited therein. The potentiometer 81, shown on Fig. 9, is inserted in the control circuit of the power means of a control system; such as described above, to permit the adjustment of the operating temperature of the overheater to a desired value.

Furthermore, in order to prevent the risk of overheating the strip, which may occur upon a sudden stop of the strip, or an increase or decrease of its speed between a stand still conditon and its normal speed of propulsion, means are provided to control the intensity of the basting effect, depending on the speed of propulsion of the strip. Such means may be constituted by a control arrangement adapted to actuate a valve, such as 71, for diluting the overheated substance supplied by overheater 69, by a nonoverheated substance, passing through the shunt 70, in regulated proportions.

Preferably, such a control, in case of a complete stop or a substantial slowing down of the strip, will suppress completely the supply of overheated substance and replace it by the flow of a nonoverheated liquid through shunt 70.

Such control means, as shown in Fig. 14, may comprise a rate generator 82, actuated by the driving means of pulleys 15 and producing a voltage variable with speed. Such voltage is applied to control a servo-motor system 83, which actuates valve 71 in response and relation to said voltage.

Fig. 8 shows another embodiment of the invention, in which the accelerated heating up of strip 12 at the end of the heat up vat 1, is produced by a flow of an overheated gas. As shown, a gas circulation conduit 84 is formed in the top 85 of the furnace. This conduit 84 has an inlet 86 arranged over the strip entry zone and its outlet 87 over the strip exit zone of the heat up vat 1.

These inlets and outlets are associated with deflectors 88 and 89, directing the gas flow tangentially from and to the surface of the strip respectively. A fan 90 is provided in the inlet portion 86 of conduit 84.

This fan 90 is driven through a shaft 92 by a motor 91, outside of the furnace, which may be supported by the furnace cover 10.

Toward its outlet 87, said conduit 84 is divided in two branches 93 and 94. In the example shown, the upper branch 93 is provided with heating means or elements 95. In the lower one 94, no heating means are provided but, on the contrary, coolers 96 may be arranged, to compensate, in case of a stop of the strip, for possible excess of temperature of the gas, as a result of the thermal inertia of the ceiling 97 of the heat up zone of the furnace directly above the strip.

Suitable valve means in the form of gates 98 are provided to control the passage of the fluid or gas through the two branches 93 and 94 in desired proportions, in accordance with the operation of the furnace. More particularly, said gates 98 may be controlled depending on the speed of the strip 12, by an arrangement similar to that used for the overheated liquid substance poured on strip 12 in accordance with Figs. 1, 2 and 3 previously described.

It is understood that in the furnace of Fig. 8 the circulation of the bath liquid at a temperature slightly lower than the critical temperature of the substance of the article under treatment, is maintained in the vats by a system similar to that of Figure 9, except for the basting apparatus.

Figure 4A:
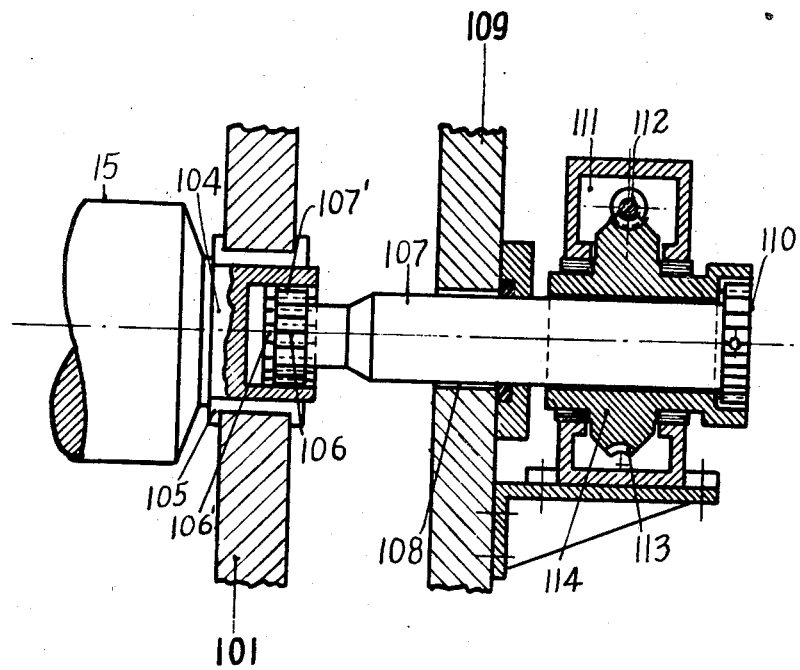
Fig. 4 is a similar view to Fig. 3, but showing a cross section of the same furnace.

Figs. 3 and 4 of the drawings show, in a somewhat schematic form, a practical embodiment of the furnace according to the invention. In this embodiment the furnace comprises 3 superposed vats, 1, 2 and 3, made of heat resistant material, capable of supporting the working temperatures of the furnace without any prohibitive deformation. However, in view of the length of the vats, their thermal expansion is considerable and, without special provisions, may interfere with the proper operation and behaviour of the furnace. For this purpose, the successive vats 1, 2 and 3 are anchored by links 99 to fixed supports 100 at one of their ends only, so that they can expand longitudinally in a direction away from their anchoring points.

As shown, the successive vats 1, 2 and 3 are anchored alternatively at opposite ends of the furnace and namely at the strip exit ends of the corresponding vats, with the driving pulleys 15 located in the immediate vicinity of the anchoring points. In this way the driving pulleys 15 and the exit pulley 16, journaled in the respective vats, are maintained in fixed relative position independently of the expansion of the vats, making the movement of the strip independent of said expansion.

In order to facilitate the relative expansion of the successive vats in opposite directions, and at the same time maintain their alignment, it is proposed to provide guiding grooves 102, receiving suitable balls or rollers 103 in the top and in the bottom of the longitudinal walls 101 of the respective vats.

As best shown in Fig. 4-a, the individual pulleys 15 of the vats are journaled in the side walls 101 of the respective vats by means of shafts 104, received in bearings 105 provided in the said walls. These shafts 104 at one side of the vats are adapted to provide a disconnectible driving connection 106 with the inner extremities of corresponding drive shafts 107. For this purpose shafts 104, at the side of said driving connection, are made hollow and are provided, on the inner side of said hollow portions, with longitudinal splines 106'. These hollow portions are adapted to receive the inner extremities of driving shafts 107, provided with corresponding outside splines 107', engaging with inner splines 106' of said hollow portions of shafts 194. Shafts 107 are mounted for rotation and longitudinal movement in appropriate openings 108 of the side wall 109 of the furnace cover 10 and have slidable driving connections 110 with driving means 111 provided on the outside of said wall.

The driving means 111 may comprise motor means (not shown), for driving shafts 112 in synchronism. Each shaft 112 may be connected through a worm gear 113 to a hub 114, having a slidable driving connection 110 with shaft 107, so that said shaft 107 can be moved axially toward or away from the furnace. In this way, shaft 107 may be disengaged from shafts 104 of pulleys 15 and 16, to permit lifting of the furnace cover 10 and engaged with said shafts 104 after the cover is lowered down.

In 14 there are shown again a pair of feed rollers and in 18, a pair of exit rollers. The first serve to feed the article to be treated, such as strip 12, into the first vat 1 and the latter help control the movement of the strip 12 leaving the furnace. The upper pair of rollers 14 is driven by means 111—114 similar to those, driving pulleys 15—16, while the lower pair 18 is driven by a shaft 117 and worm gear device 118, actuated in synchronism with driving means 111 of pulleys 15 and 16.

Figure 3 illustrates also the circulation of the bath substance in the respective vats as previously described. This substance is introduced into the heat up vat 1 through lateral openings 73 at the strip exit end of said vat. At the opposite end, the bath substance overflows into collector 56, forming part of the circulation system previously described.

The bath substance is supplied into the first soaking vat 2 through a pair of openings 74 at the bottom of said vat and directing the flow of said substance underneath the strip 12 at the points at which it leaves pulley 15. The same figure shows at 76 the overflow communication between soaking vats 2 and 3, provided at the strip exit end of vat 2 and at the strip entry end of vat 3. The above arrangements have been previously described with reference to Figure 5.

The invention provides thus an improved construction of liquid bath furnaces for the continuous heat treatment of articles of manufacture, made of metal or any other material, in which the article is floated on a bath of heated substance, both for its transportation through the furnace and for its heating up, through a direct contact between the article and the bath, this improved construction permitting the reduction of the length of the furnace. The described invention is applicable more particularly to the continuous heat treatment of light metals and alloys, such as aluminum and magnesium base alloys. In the case of such alloys, the bath substance will be molten lead.

It is understood that the specific execution of the furnace, its subdivision, size and shape, the manner of driving the objects under treatment and the like elements of the device executed in accordance with this invention may be chosen at will without widening thereby the scope of this invention.

It should also be understood that this improved process, although it is particularly intended for the treatment of "endless" products, such as strip, wire, bar, tube and the like, may also be advantageous to the treatment of non continuous objects, said objects being introduced into the furnace through an inlet opening, advanced over the bath through the agency of any suitable means and finally removed through an outlet opening of the furnace.

What I claim is:

1. In a continuous heat treatment of articles of manufacture of the kind specified, in a liquid bath furnace, in which the article, in a floating condition, is moved over the surface of a heating up bath of molten metal of higher specific gravity than the article to be treated, where said article is heated up to the temperature of heat treatment, which is slightly lower than the critical temperature of the material of said article, the method for accelerating the heating up of the article in such a bath, consisting in bringing into direct contact with the exposed surface of the floating article a flow of hot fluid, having a temperature substantially equal to or slightly higher than said critical temperature.

2. In a continuous heat treatment of articles of manufacture of the kind specified in a liquid bath furnace, in which the article, in a floating condition, is moved over the surface of a heat up bath of molten metal of higher specific gravity than the article to be treated, where said article is heated up to the temperature of heat treatment, which is slightly lower than the critical temperature of the material of said article, the method for accelerating the heating up of the article in such a bath, consisting in basting the article floating on said bath with the same molten metal substance as that of the bath, but heated up to a temperature substantially equal to or slightly higher than said critical temperature.

3. In a continuous heat treatment of articles of manufacture of the kind specified, in a liquid bath furnace, in which the article, in a floating condition, is moved over the surface of a heating up bath of molten metal of higher specific gravity than the article to be treated, where said article is heated up to the temperature of heat treatment, which is slightly lower than the critical temperature of the material of said article, the method for accelerating the heating up of the article in such a bath, consisting in bringing into direct contact with the exposed surface of the article floating on the bath, a flow of gas at a temperature substantially equal to or slightly higher than said critical temperature.

4. In a continuous heat treatment of articles of manufacture of the kind specified, in a liquid bath furnace, in which the article, in a floating condition, is moved over the surface of a heat up bath of molten metal of a higher specific gravity than the article to be treated, where said article is heated up to the temperature of heat treatment, which is slightly lower than the critical temperature of the material of said article, the method for accelerating the heating up of the article in such a bath, consisting in bringing into direct contact with the exposed surface of the floating article a flow of hot fluid, having a temperature substantially equal to or slightly higher than said critical temperature and varying the supply of said hot fluid dependent on the speed of propulsion of the article through said bath.

5. In a continuous heat treatment of articles of manufacture of the kind specified in a liquid bath furnace, in which the article, in a floating condition, is moved over the surface of a heat up bath of molten metal of a higher specific gravity than the article to be treated, where said article is heated up to the temperature of heat treatment, which is slightly lower than the critical temperature of the material of said article, the method for accelerating the heating up of the article in such a bath, consisting in bringing into direct contact with the exposed surface of the floating article a flow of hot fluid, having a temperature substantially equal to or slightly higher than said critical temperature and controlling the supply of said fluid, dependent on the speed of propulsion of the article through said bath, so as to suppress said supply of hot fluid and replace it by a flow of fluid at a temperature lower than said critical temperature in case of a complete stop or a substantial slowing down of the propulsion of the article in said bath.

6. An improved liquid bath furnace for continuous heat treatment of articles of manufacture of the kind specified, comprising a furnace base, a stack of superimposed vats resting on the furnace base and containing hot baths of molten metal of a higher specific gravity than the article to be treated, the uppermost of said vats containing a bath for heating up the article to be treated and the other vats containing soaking baths, a structure enclosing said vats in a substantially gas tight chamber and having an inlet and an outlet for the articles under treatment, means for maintaining a controlled atmosphere in said chamber, means for maintaining the circulation of molten metal through the heat up vat by supplying molten metal at one end thereof and evacuating it at the other end thereof, the direction of said circulation being opposite to that of the motion of the article, means for maintaining the circulation of molten metal through the soaking vats comprising means for supplying it at one end of the uppermost of said soaking vats and evacuating it from the lowermost vat and means between the successive soaking vats for permitting the flow of molten metal from an upper vat to a lower vat at alternate ends thereof, the direction of said circulation being the same as that of the motion of the article, means for feeding the articles to be treated through said inlet upon the surface of said heat up bath and then upon successive soaking baths, so that said article is moved in a floating condition first over the surface of said heat up bath and then successively over the surface of the respective soaking baths, means for guiding the articles out of said chamber through said outlet, and means, in association with said heat up bath, for bringing into direct contact with the article under treatment, and substantially at the article exit end of said bath, a flow of hot fluid to produce an accelerated heating up of said article prior to its admission to a soaking bath, fixed supports carried by said base, one end of each vat being anchored to a support, the opposite end of the vat being free to permit thermal expansion along the direction of the movement of the article passing through the vats.

7. An improved liquid bath furnace for continuous heat treatment of a metal article of manufacture of the kind specified, a furnace base, means for progressively floating said article through a series of hot molten metal baths comprising a stack of superposed vats resting on the furnace base and containing hot baths of molten metal of a higher specific gravity than the article to be treated, a structure enclosing said vats in a substantially gas tight chamber and having an inlet and an outlet, means for maintaining a controlled atmosphere in said chamber, means for introducing the molten metal at one end of each vat and for permitting the escape of said molten metal at the other end of each vat, so that the molten metal in each vat flows from one end thereof to the other, means for maintaining the circulation of molten metal through all vats comprising means for extracting the molten metal from the lowermost soaking vat and supplying it to the uppermost soaking vat, and means between the successive soaking vats for permitting the flow of molten metal from an upper soaking vat to a lower soaking vat at alternate ends of said stack of vats, means for feeding the article to be heat treated through said inlet, means for continuously moving said article in a floating condition successively upon the surfaces of said baths contained in the superposed vats and out through said outlet, fixed supports carried by said base, one end of each vat being anchored to a support, the opposite end of the vat being free to permit thermal expansion along the direction of the movement of the article passing through the vats.

8. An improved liquid bath furnace for continuous heat treatment of a metal article of manufacture of the kind specified, a furnace base, means for progressively floating said article through a series of hot molten metal baths of higher specific gravity than the article to be heated comprising a heat up vat containing a molten metal bath for heating up articles passing therethrough and a succession of separate vats resting on the furnace base containing soaking molten metal baths, said soaking vats resting on the furnace base and being stacked one above another, with said heat up vat provided at the top of said stack, a structure enclosing said vats in a substantially gas tight chamber, and having an inlet and an outlet for passage of the article, means for maintaining a controlled atmosphere in said chamber, means for maintaining the circulation of molten metal through the heat up vat by supplying molten metal at one end thereof and evacuating it at the other end thereof, the direction of said circulation being opposite to that of the motion of the article, means for maintaining the circulation of molten metal through the soaking vats comprising means for supplying it at one end of the uppermost of said soaking vats and evacuating it from the lowermost vat, and means between the successive soaking vats for permitting the flow of molten metal from an upper vat to a lower vat at alternate ends of said stack of soaking vats, the direction of said circulation being the same as that of the motion of the article, means for feeding the article to be heat treated through said inlet and upon the surface of said heat up bath, then upon the surfaces of the successive superposed soaking baths, so that said article is moved in a floating condition upon the surfaces of said baths, means for guiding the article out of said chamber through said outlet, fixed supports carried by said base, one end of each vat being anchored to a support, the opposite end of the vat being free to permit thermal expansion along the direction of the movement of the article passing through the vats.

9. An improved liquid bath furnace for continuous heat treatment of a metal article of manufacture of the kind specified, a furnace base, a succession of separate vats resting on the furnace base and containing hot molten metal baths, means for progressively floating said article through said hot molten metal baths of higher specific gravity than the article to be treated comprising a heat up molten bath for heating up the article passing therethrough and at least one soaking bath in which the article passes therethrough, a structure enclosing said baths in a substantially gas tight chamber and having an inlet and an outlet for the article under treatment, means for maintaining a controlled atmosphere in said chamber, means for introducing the molten metal at one end of each vat and for permitting its escape at the other end of each vat so that the molten metal in each vat flows from one end thereof to the other, the direction of flow in the heat up vat being opposite to that of the motion of the article passing through it and in the soaking vat being the same as that of the motion of the article, means for feeding the article to be heat treated through said inlet and upon the surface of said heat up bath and then upon successive soaking baths, so that said article is moved in a floating condition over the surfaces of said baths, means for guiding said article through said outlet, and means in association with said first bath for introducing substantially at the article exit end thereof and into direct contact with said article a flow of hot fluid to produce an accelerated heat up of said article prior to its admission to the soaking bath, fixed supports carried by said base, one end of each vat being anchored to a support, the opposite end of the vat being free to permit thermal expansion along the direction of the movement of the article passing through the vats.

10. An improved liquid bath furnace for continuous heat treatment of a metal article of manufacture of the kind specified, a furnace base, means for progressively floating said article through a series of hot molten metal baths comprising a stack of superposed vats resting on the furnace base and containing hot baths of molten metal of a higher specific gravity than the article to be treated, a structure enclosing said vats in a substantially gas tight chamber and having an inlet and an outlet, means for maintaining a controlled atmosphere in said chamber, means for introducing the molten metal at one end of each vat and for permitting the escape of said molten metal at the other end of each vat, so that the molten metal in each vat flows from one end thereof to the other, means for maintaining the circulation of molten metal through all vats comprising means for extracting the molten metal from the lowermost soaking vat and supplying it to the uppermost soaking vat, and means between the successive soaking vats for permitting the flow of molten metal from an upper soaking vat to a lower soaking vat at alternate ends of said stack of vats, means for feeding the article to be heat treated through said inlet, means for continuously moving said article in a floating condition successively upon the surfaces of said baths contained in the superposed vats and out through said outlet and comprising driving and travel reversing pulleys at the article exit end of each bath, said pulleys partially dipping into each following bath to increase the adherence to its surface of said article by the hydrostatic force exerted by said bath on said article, fixed supports carried by said base, one end of each vat being anchored to a support, the opposite end of the vat being free to permit thermal expansion along the direction of the movement of the article passing through the vats.

11. An improved liquid bath furnace for continuous heat treatment of a metal article of manufacture of the kind specified, a furnace base, means for progressively floating said article through a series of hot molten metal baths comprising a stack of superposed vats resting on the furnace base and containing hot baths of molten metal of a higher specific gravity than the article to be treated, a structure enclosing said vats in a substantially gas tight chamber and having an inlet and an outlet, means for maintaining a controlled atmosphere in said chamber, means for introducing the molten metal at one end of each vat and for permitting the escape of said molten metal at the other end of each vat, so that the molten metal in each vat flows from one end thereof to the other, means for maintaining the circulation of molten metal through all vats comprising means for extracting the molten metal from the lowermost soaking vat and supplying it to the uppermost soaking vat, means for feeding the article to be heat treated through said inlet, means for continuously moving said article in a floating condition successively upon the surfaces of said baths contained in the superposed baths and out through said outlet and comprising driving and travel reversing pulleys at the article exit end of each bath and dipping partially into each following bath, means between the successive soaking vats for permitting the flow of molten metal from an upper soaking vat to a lower soaking vat at alternate ends of said stack of vats and comprising an outlet conduit opening into the first vat at the article exit end of each vat and an inlet conduit opening into the article entry end of the following vat at a point where the article emerges from under the lower part of the corresponding driving pulley dipping into the bath of said last named vat, fixed supports carried by said base, one end of each vat being anchored to a support, the opposite end of the vat being free to permit thermal expansion along the direction of the movement of the article passing through the vats.

12. An improved liquid bath furnace for continuous heat treatment of a metal article of manufacture of the kind specified, a furnace base, means for progressively floating said article through a series of hot molten metal baths comprising a stack of superposed vats resting on the furnace base and containing hot baths of molten metal of a higher specific gravity than the article to be treated, a structure enclosing said vats in a substantially gas tight chamber and having an article inlet and an article outlet, means for maintaining a controlled atmosphere in said chamber, means for introducing the molten metal at one end of each vat and for permitting the escape of said molten metal at the other end of each vat, so that the molten metal in each vat flows from one end thereof to the other, means for maintaining the circulation of molten metal through all vats comprising means for extracting the molten metal from the lowermost soaking vat and supplying it to the uppermost soaking vat, means for feeding the article to be heat treated through said article inlet, means for continuously moving said article in a floating condition successively upon the surfaces of said baths contained in the superposed baths and out through said article outlet and comprising driving and travel reversing pulleys at the article exit end of each bath and dipping partially into each following bath, means between the successive soaking vats for permitting the flow of molten metal from an upper soaking vat to a lower soaking vat at alternate ends of said stack of vats and comprising a molten metal outlet conduit opening into the first vat at the article exit end of each vat and a molten metal inlet conduit opening into the article entry end of the following vat, the molten metal outlet conduit opening at the bottom of the upper of the two successive soaking vats and having an upward inflexion providing an edge for the overflow of the molten metal substance of the bath from said upper vat at a level substantially corresponding to the level of the bath in said upper vat, the said molten metal inlet conduit having a funnel for collecting the molten metal from the said molten metal outlet conduit, said molten metal inlet conduit leading to an opening in the bottom of the lower of the two successive vats, fixed supports carried by said base, one end of each vat being anchored to a support, the opposite end of the vat being free to permit thermal expansion along the direction of the movement of the article passing through the vats.

13. The liquid bath furnace of claim 12, in which the inlet conduit opening comprises two nozzles in the bottom of said vat, located at the opposite sides of the vat and in a position to direct the stream of the molten metal bath substance upwardly and toward the center portion of the bath.

14. An improved liquid bath furnace for continuous heat treatment of a metal article of manufacture of the kind specified, a furnace base, means for progressively floating said article through a series of hot molten metal baths comprising a stack of superposed vats resting on the furnace base and containing hot baths of molten metal of a higher specific gravity than the article to be treated, a structure enclosing said vats in a substantially gas tight chamber and having an inlet and an outlet, means for maintaining a controlled atmosphere in said chamber, means for introducing the molten metal at one end of each vat and for permitting the escape of said molten metal at the other end of each vat, so that the molten metal in each vat flows from one end thereof to the other, means for maintaining the circulation of molten metal through all vats comprising means for extracting the molten metal from the lowermost soaking vat and supplying it to the uppermost soaking vat, and means between the successive soaking vats for permitting the flow of molten metal from an upper soaking vat to a lower soaking vat at alternate ends of said stack of vats, means for feeding the article to be heat treated through said inlet, means for continuously moving said article in a floating condition successively upon the surfaces of said baths contained in the superposed vats and out through said outlet, fixed supports carried on the base and means for mounting the successive vats on the furnace base for free sliding movement due to thermal expansion along the direction of the movement of the article passing therethrough, the vats being anchored to the fixed supports at their ends carrying the driving and travel reversing pulleys.

15. The liquid bath furnace of claim 14, in which the superposed vats have longitudinal walls in vertical alignment, and antifriction bearing elements interposed between the longitudinal walls of the respective vats.

16. The liquid bath furnace of claim 7, in which the vats are provided with means for deforming the progression of the liquid metal bath longitudinally to the vat into a directed circulation to cause the liquid metal bath to circulate at the bottom of the vat with a transverse motion component directed from the middle of the vat towards its sides and at the surface of the bath with a transverse motion component directed from the sides of the vat towards its middle to exert thereby a centralizing effect on the article under treatment floating on the bath, the said means comprising an upper and lower network of partitions adapted to extend from the bottom of the vat to a level just below the surface of the vat and separated by a horizontal partition having openings, the partitions of the upper network converging toward the central axis of the vat in the direction of movement of the article, the partitions of the lower network diverging along the same direction.

References Cited in the file of this patent

UNITED STATES PATENTS

| | | |
|---|---|---|
| 70,881 | Monk | Nov. 12, 1867 |
| 752,768 | Goodwin | Feb. 23, 1904 |
| 1,224,340 | Trood | May 1, 1917 |
| 1,811,522 | Shover et al. | June 23, 1931 |
| 1,872,712 | Fahrenwald | Aug. 23, 1932 |
| 1,916,407 | Bellis | July 4, 1933 |
| 1,990,707 | Moore | Feb. 12, 1935 |
| 2,025,990 | Kokemper | Dec. 31, 1935 |
| 2,134,457 | Tainton | Oct. 25, 1938 |
| 2,141,382 | Ferm | Dec. 27, 1938 |
| 2,216,544 | True et al. | Oct. 1, 1940 |
| 2,309,745 | Bergin | Feb. 2, 1943 |
| 2,311,099 | Tainton | Feb. 16, 1943 |
| 2,316,144 | Coxe | Apr. 6, 1943 |
| 2,338,165 | Caugherty | Jan. 4, 1944 |
| 2,424,034 | Hopper | July 15, 1947 |
| 2,488,997 | Thornburg | Nov. 22, 1949 |

OTHER REFERENCES

Trinks' Industrial Furnaces, volume 1, third edition, page 287, copyrighted 1934 by John Wiley and Son, New York, N.Y.